(12) United States Patent
Shinada

(10) Patent No.: US 7,457,966 B2
(45) Date of Patent: Nov. 25, 2008

(54) DATA FILE PROCESSING APPARATUS, REMOTE CONTROL APPARATUS FOR DATA FILE PROCESSING APPARATUS AND CONTROL METHOD FOR DATA FILE PROCESSING APPARATUS

(75) Inventor: Akira Shinada, Tokyo (JP)

(73) Assignee: Sony Corporation, Tokyo (JP)

( * ) Notice: Subject to any disclaimer, the term of this patent is extended or adjusted under 35 U.S.C. 154(b) by 593 days.

(21) Appl. No.: 10/376,325

(22) Filed: Mar. 3, 2003

(65) Prior Publication Data

US 2003/0177369 A1   Sep. 18, 2003

(30) Foreign Application Priority Data

Mar. 4, 2002   (JP) .............................. 2002-057442

(51) Int. Cl.
*H04K 1/00* (2006.01)
(52) U.S. Cl. ........................ 713/185; 382/100; 382/115; 382/116; 382/117; 382/118; 382/124; 713/167
(58) Field of Classification Search ................. 713/185, 713/167
See application file for complete search history.

(56) References Cited

U.S. PATENT DOCUMENTS

| | | | | |
|---|---|---|---|---|
| 6,317,544 | B1 * | 11/2001 | Diehl et al. .................. | 385/115 |
| 6,694,339 | B1 * | 2/2004 | Hirose et al. ................ | 707/203 |
| 7,114,075 | B1 * | 9/2006 | Yasuda et al. ............... | 713/182 |
| 2002/0174344 | A1 * | 11/2002 | Ting ........................... | 713/185 |

FOREIGN PATENT DOCUMENTS

JP   2000-235546   8/2000

* cited by examiner

*Primary Examiner*—Nasser Moazzami
*Assistant Examiner*—Fikremariam Yalew
(74) *Attorney, Agent, or Firm*—Oblon, Spivak, McClelland, Maier & Neustadt, P.C.

(57) ABSTRACT

A data file processing apparatus and a remote control apparatus and a control method for a data file processing apparatus are disclosed wherein a user can simply and easily find out a data file or the like recorded by the user itself from among a large number of data files recorded on a recording medium. In the data file processing apparatus, a user who operates a remote control apparatus is identified and an identification code is set based on a result of the identification, and a file is recorded together with the identification code.

12 Claims, 4 Drawing Sheets

DATA FILE PROCESSING APPARATUS, REMOTE CONTROL APPARATUS FOR DATA FILE PROCESSING APPARATUS AND CONTROL METHOD FOR DATA FILE PROCESSING APPARATUS

BACKGROUND OF THE INVENTION

This invention relates to a data file processing apparatus, a remote control apparatus for a data file processing apparatus and a control method for a data file processing apparatus and can be applied, for example, to a home server for recording a data file of video data.

Usually, a file of video data (hereinafter referred to as video file) which is a large capacity data file is recorded by a video tape recorder, an optical disk apparatus, a hard disk apparatus or the like. In a video tape recorder, optical disk apparatus or hard disk apparatus, timer recording can be performed by operation of a remote commander, and also a program being broadcast can be recorded.

Incidentally, in recent years, the recording capacity of an optical disk apparatus and a hard disk apparatus has increased remarkably. Therefore, it is estimated that, in the near future, a plurality of users can commonly use an optical disk or a hard disk apparatus to record a great number of video files.

However, if a plurality of users commonly use an optical disk or a hard disk apparatus to record a great number of video files as described above, then each user is obliged to search out a video file or files recorded by the user itself from among a large number of recorded video files. Therefore, it is considered that it is difficult for the user to search out a desired video file in a short time.

SUMMARY OF THE INVENTION

It is an object of the present invention to provide a data file processing apparatus, a remote control apparatus for a data file processing apparatus and a control method for a data file processing apparatus wherein a user can simply and easily find out a data file or the like recorded by the user itself from among a large number of data files recorded on a recording medium.

In order to attain the object described above, according to the present invention, a user is identified and an identification code is set based on a result of the identification, and then a data file is recorded together with the identification code on the recording medium.

More particularly, according to an aspect of the present invention, there is provided a data file processing apparatus for accepting an instruction issued from a user through a terminal apparatus and recording a data file relating to the instruction on a randomly accessible recording medium, including user identification means for identifying the user, and file-recording means for setting, based on a result of the identification by the user identification means, an identification code for identifying the user and recording the data file together with the identification code on the recording medium.

According to another aspect of the present invention, there is provided a remote control apparatus for a data file processing apparatus which records a data file indicated by an instruction by a remote control signal on a randomly accessible recording medium, including user identification means for identifying the user, and transmission means for transmitting an identification code for identifying the user based on a result of the identification by the user identification means to the data file processing apparatus.

According to a further aspect of the present invention, there is provided a control method for a data file processing apparatus which receives an instruction from a user through a terminal apparatus and records a data file relating to the instruction on a randomly accessible recording medium, including a user identification step of identifying the user, and a file recording step of setting of an identification code, based on a result of the identification by the user identification step, an identification code for identifying the user and recording the data file together with the identification code on the recording medium.

According to a still further aspect of the present invention, there is provided a remote control method for a data file processing apparatus which records a data file indicated by an instruction by a remote control signal on a randomly accessible recording medium, including, a user identification step of identifying the user, and a transmission step of transmitting an identification code for identifying the user to the data file processing apparatus based on a result of the identification by the user identification step.

In summary, according to the present invention, a user who operates a remote control apparatus is identified and an identification code is set based on a result of the identification, and a file is recorded together with the identification code. Consequently, each user can simply and readily find out those files recorded by the user itself from among a large number of files recorded on a recording medium.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

DESCRIPTION OF THE PREFERRED EMBODIMENTS (1) First Embodiment (1-1) Configuration of the First Embodiment FIG. 1 shows a configuration of a home server to which the present invention is applied together with a remote commander therefor. Referring to FIG. 1, the home server 1 is a data file processing apparatus which processes video files of video data and audio files of audio data, and changes over operation thereof in accordance with a remote control signal outputted from a remote commander 2. Thus, the home server 1 records video data and audio data outputted from various video apparatus, and reproduces such recorded video data and audio data to provide them to a user.

The remote commander 2 includes a key operation section 3 including various operation elements necessary for control of the home server 1. It is to be noted that the operation elements include operation elements for inputting time, a channel to be recorded and so forth, operation elements for issuing instructions of recording, reproduction and so forth, and other necessary operation elements.

A fingerprint acquisition section 4 serves as image acquisition means for acquiring an image of a fingerprint of a user who operates the remote commander 2 and outputting data of the image. More particularly, the fingerprint acquisition section 4 acquires an image of a fingerprint by means of an image pickup mechanism to which, for example, a CCD image pickup element is applied or through detection of electrostatic capacitance values between a finger and very small electrodes arranged in a matrix through a window provided at a predetermined position of a case of the remote commander 2.

Figure 1:
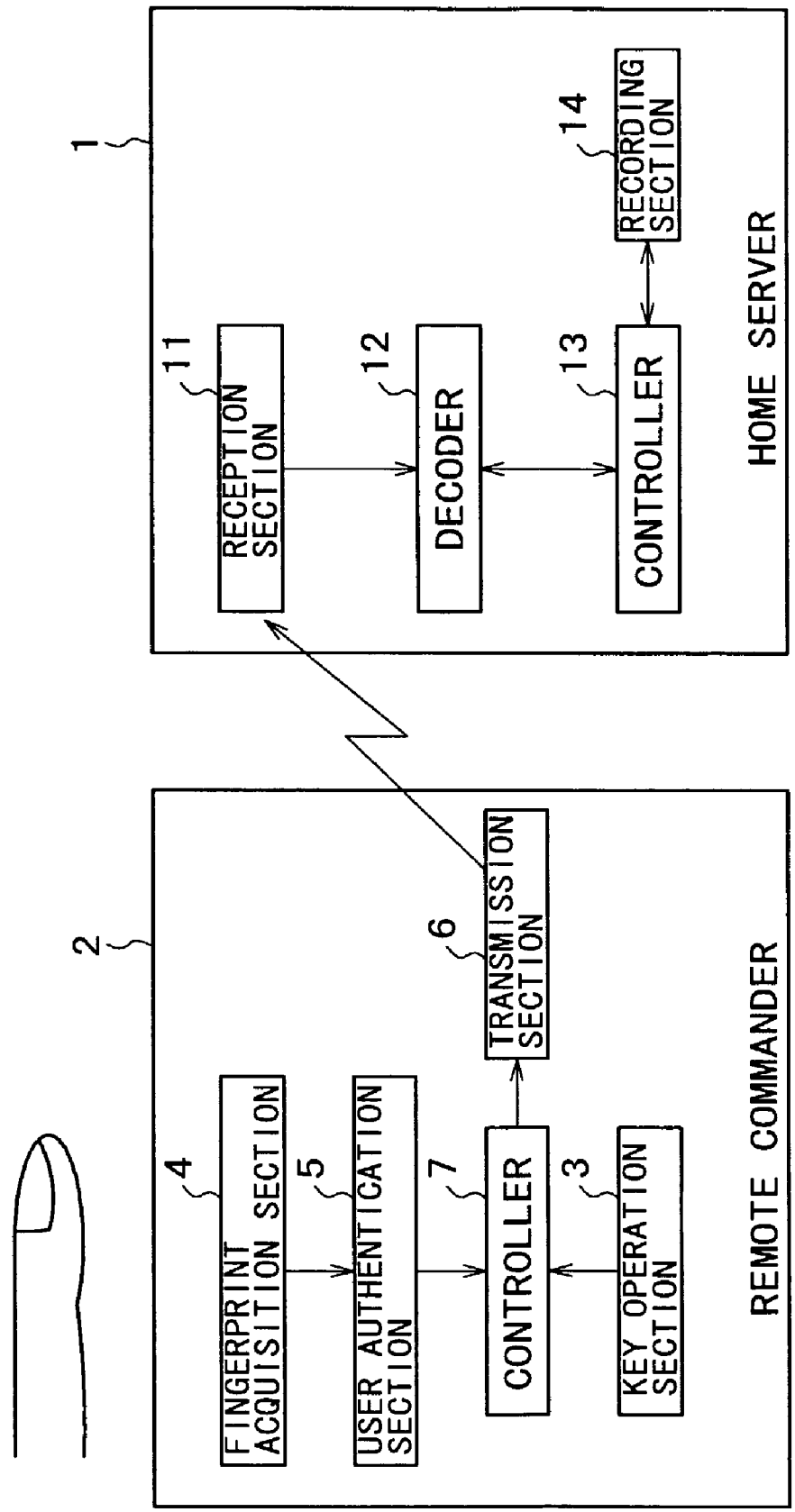
FIG. 1 is a block diagram showing a home server to which the present invention is applied together with a remote commander therefor.

A user authentication section 5 processes, upon user registration, the image data outputted from the fingerprint acquisition section 4 and records a result of the process into a memory not shown in FIG. 1. It is to be noted here that the user registration is a process for registering, in order to make it possible to specify each user who operates the remote commander 2, the user into the remote commander 2. On the other hand, except upon such user registration, the user authentication section 5 processes the image data outputted from the fingerprint acquisition section 4 and compares the resulting data with a processing result stored formerly in the memory to detect the user who operates the remote commander 2 from among users registered by the process described above, and outputs a result of the detection. The user authentication section 5 outputs a result of identification representing what numbered registered user operates the remote commander 2 is, or a result of identification representing that the user is not a registered user.

Consequently, the fingerprint acquisition section 4 and the user authentication section 5 cooperatively serve as user identification means for identifying a user. Further, the fingerprint acquisition section 4 serves as information acquisition means for acquiring an image of a fingerprint which is information indicating a physical characteristic of a user and further is image information of part of the body of the user. Meanwhile, the user authentication section 5 serves as user authentication means for specifying a user based on information acquired by the information acquisition means.

A transmission section 6 outputs a remote control signal to the home server 1 under the control of a controller 7.

The controller 7 serves as control means for controlling operation of the remote commander 2. If a user operates the key operation section 3 to issue an instruction of user registration, then the controller 7 issues an instruction to the fingerprint acquisition section 4 and the user authentication section 5 to perform the user registration process. Consequently, the remote commander 2 performs user registration of a user who operates the remote commander 2.

In the process just mentioned, when a processing result of a fingerprint is recorded into a memory in the user authentication section 5, the controller 7 displays a massage on a display section not shown in FIG. 1 and accepts an input of a limitation item. Here, the limitation item is an item for limiting a readable range of video files and audio files recorded in the home server 1 for each user registered as described above. In the present embodiment, a setting wherein all of data files recorded in the home server 1 can be read without any limitation and another setting wherein only data files recorded by an instruction of a user itself can be read are available, and the controller 7 accepts a selection from between the two settings by a user.

After the controller 7 accepts the input of a limitation item, it starts up operation of the transmission section 6 so that the data of the limitation item are transmitted to the home server 1 together with an identification code for specifying the user who has performed the user registration.

Further, if the user operates the key operation section 3 to issue an instruction to change over the operation of the home server 1 or the like, then the controller 7 controls operation of the transmission section 6 in response to the operation element operated by the user to signal a corresponding remote control signal to the home server 1 thereby to changeover the operation of the home server 1.

If the user issues an instruction to record or reproduce video data and audio data to be outputted from a video apparatus in the processing described above, then the controller 7 starts up operation of the fingerprint acquisition section 4 and the user authentication section 5 to acquire a result of identification of the user who has issued the instruction. Based on the identification result, the controller 7 controls operation of the transmission section 6 so that it outputs a remote control signal based on the identification code for identification of the user together with a remote control signal for instruction of recording or reproduction. Similarly, the controller 7 accepts a timer recording instruction from a user and signals a remote control signal together with an identification code to notify the home server 1 of timer recording or notifies the home server 1 of an identification code of the user who has issued the recording instruction. Therefore, the controller 7 cooperates with the transmission section 6 to form transmission means for transmitting an identification code for identification of a user to the data file processing apparatus. It is to be noted that, if an identification result that the user who operates the remote commander 2 is not any of the users who have made user registration into the remote commander 2 is obtained, then the controller 7 issues a notification of the identification result in the form of the identification code.

Meanwhile, the home server 1 includes a reception section 11 which receives a remote control signal outputted from the remote commander 2 and outputs a result of the reception to a decoder 12. The decoder 12 processes the reception result to detect a control command from the remote commander 2 and notifies a controller 13 of the control command. A recording section 14 is a recording and reproduction apparatus of a large capacity for recording and reproducing video files and audio files and is formed from a randomly accessible recording medium. In the present embodiment, for example, an optical disk apparatus or a hard disk apparatus is applied as the recording section 14.

The controller 13 serves as control means for controlling operation of a video apparatus connected to the home server 1, and analyzes a control command inputted from the decoder 12 and executes suitable control in accordance with the control command. In the processing, if a user registration process is executed on the remote commander 2 and an identification code of a user who has performed the user registration and data of a limitation item is received from the remote commander 2, then the controller 13 stores the received identification code and data into a memory not shown in FIG. 1. Thus, the controller 13 records, with regard to a user who operates the remote commander 2, an identification code for identification of the user and data of a limitation item through user registration.

Further, if a recording instruction is issued from the remote commander 2, then the controller 13 issues a control command to a video apparatus connected to the home server 1 in accordance with a control command obtained from the decoder 12 to assure an output source of a video file and an audio file to be recorded. Further, the controller 13 starts up operation of the recording section 14 so that video data and audio data outputted from the output source are successively recorded by the recording section 14. When such video data and audio data are recorded until recording of the video file and the audio file is completed, the controller 13 updates a recording history file held in the recording section 14.

The recording history file allocates, to each of video files and audio files recorded by the recording section 14, an identification code of a user who has issued the recording instruction, the date of recording, data representative of an output source, data for specifying the recorded data files and so forth. Where such recording is timer recording, when the recording starting time comes, the controller 13 starts a sequence of required processes and then updates the recording history file similarly so that, also in this instance, it can be discriminated in accordance with whose instruction the data file has been recorded. It is to be noted that, also when an instruction to delete a data file is issued from a user, the controller 13 controls operation of the recording section 14 so that the corresponding data file may be deleted and updates the recording history file so that such deletion of the data file may be registered.

Consequently, the controller 13 provides a recorded data file to a user based on an identification code recorded in the recording history file in this manner so that, also where a great number of data files are recorded in the recording section 14, a data file recorded by a user can be found out simply and with certainty from among the large number of data files.

Figure 2:
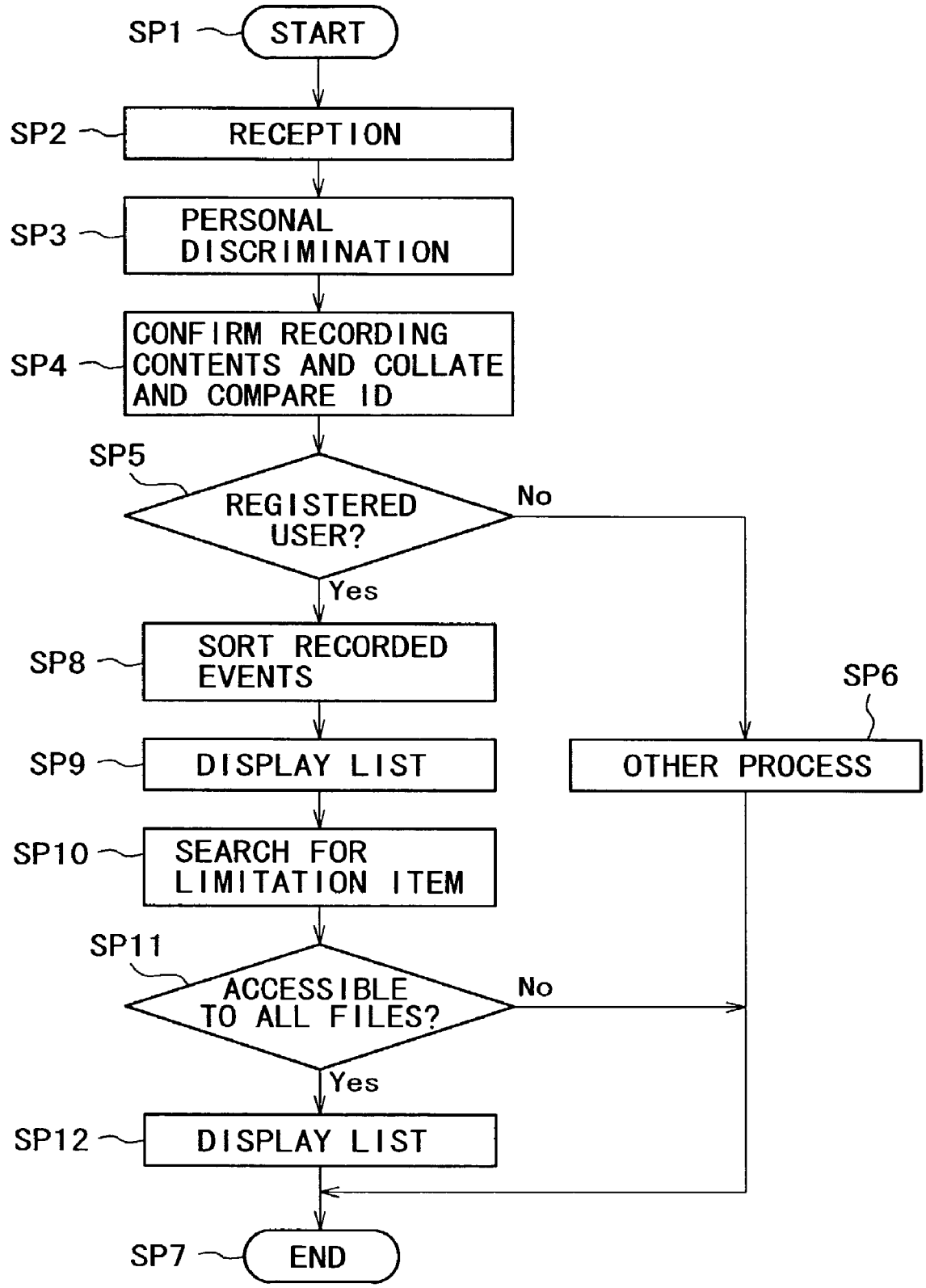
FIG. 2 is a flow chart illustrating a processing procedure of a controller shown in FIG. 1.

FIG. 2 illustrates a processing procedure of the controller 13 upon reproduction. Referring to FIG. 2, the controller 13 starts the processing procedure in response to reception of a reproduction command through the decoder 12 and advances its processing from step SP1 to step SP2. At step SP2, the controller 13 receives the reproduction command, and then at step SP3, the controller 13 acquires a result of identification by a user authentication (personal identification) process of the user authentication section 5 of the remote commander 2 from the remote commander 2 through an identification code added to the received control command.

Then, the processing advances to step SP4, at which the controller 13 collates and compares the identification code added to the reproduction command in this manner and confirms contents to be recorded based on the identification code. Then at step SP5, the controller 13 discriminates based on the identification code whether or not the user who operates the remote commander 2 is one of the registered users. If a negative result is obtained at step SP5, then the controller 13 advances the processing to step SP6, at which it executes some other corresponding process, whereafter the processing advances to step SP7, at which the controller 13 ends its processing. The corresponding process here is, for example, a process set in advance by a user and is a process of displaying, if it is set in advance to reject use of any user who is not registered as a user, a message representing this.

On the other hand, if an affirmative result is obtained at step SP5, then the controller 13 advances the processing from step SP5 to step SP8. At step SP8, the controller 13 searches the records of the recording history file to search for records of recorded data files of the corresponding user. Then at step SP9, the controller 13 displays the thus searched out records of data files in a list. Consequently, any user can find out data files recorded by the user itself simply and with certainty from among a great number of recorded data files in the home server 1.

In particular, the controller 13 displays the searched out records of the data files in a list, and if the remote commander 2 is operated to select one of the records of data files and an instruction to reproduce the selected record of data file is issued by the user, then the controller 13 issues a reproduction instruction of the corresponding data file to the recording section 14. Consequently, the recording section 14 reproduces and provides the data file to the user.

On the other hand, if the user issues a display changing over instruction, then the controller 13 advances the processing from step SP9 to step SP10, at which it refers to the records of the memory to search for data of a limitation item relate to the user of the identification code. Consequently at step SP11, the controller 13 refers to the searched out data of a limitation item to discriminate whether or not the user who has operated the remote commander 2 is permitted to read all of the data files. If a negative result is obtained, then the controller 13 advances the processing from step SP11 to step SP7, at which it ends the processing procedure without changing over the display. Consequently, where limitations are set for the user, the home server 1 permits the user to read only those data files which have been recorded in accordance with an instruction of the user itself.

On the other hand, if a negative result is obtained at step SP11, then the controller 13 advances the processing from step SP11 to step SP12, at which a list of all of the other data files is displayed, whereafter the processing advances to step SP7. Consequently, in this instance, the controller 13 permits the user to read all of the data files recorded in the recording section 14.

(1-2) Operation of the First Embodiment

If a user registration instruction is issued from a user to the home server 1 having the configuration described above, then an image of a fingerprint is acquired by the fingerprint acquisition section 4 and is then processed by the user authentication section 5 so as to be suitable for fingerprint collation, whereafter it is recorded into the memory. Thus, the home server 1 registers the user as a registered user into the remote commander 2.

Further, the home server 1 accepts selection of whether or not limitations should be provided for reading of recorded data files, and data of a limitation item regarding such limitation are transmitted from the remote commander 2 to the home server 1 together with an identification code of the user registered as a registered user. In the home server 1, the identification code and the data of a limitation item is recorded into the memory.

On the other hand, if the user operates the remote commander 2 to issue an instruction to record a program or the like, then the fingerprint acquisition section 4 of the remote commander 2 acquires an image of a fingerprint of the user, and then the user authentication section 5 processes the fingerprint image and discriminates whether or not the fingerprint image is that of one of the registered users. Consequently, in the home server 1, the user who has issued the recording instruction is identified by the processing on the remote commander 2, and a result of the identification is conveyed in the form of an identification code for specification of the user to the home server 1.

In the home server 1, video data and audio data corresponding to the recording instruction are successively recorded by the recording section 14. Then, if the recording of one video file or one audio file comes to an end, then the recording history file representing which user has issued the recording instruction of the video file and audio file recorded by the recording section 14 is updated. Consequently, in the home server 1, an identification code for identification of a user is set and a data file is recorded in a corresponding relationship to the identification code, and therefore, even where a large number of data files are recorded, a desired one of the data files can be found simply and certainly with reference to an identification code.

In particular, in the home server 1, if a user operates the remote commander 2 to issue a reproduction instruction, then an image of a fingerprint of the user is acquired by the remote commander 2 and the user is identified based on the fingerprint image in a similar manner as upon recording. The remote commander 2 adds an identification code based on a result of the identification and transmits a command for a reproduction instruction together with the identification code to the home server 1. In the home server 1, contents of the recording history file are searched according to the identification code, and video files and audio files which have been recorded in accordance with instruction of the user who has issued the reproduction instruction are displayed in a list with reference to the identification code. Consequently, in the home server 1, even where a large number of users utilize it and further even where a great number of data files are stored in the recording section 14, each user can find out data files recorded by the user itself simply and certainly.

Further, in the home server 1, if data files recorded by a user itself are displayed and a display changing over instruction is issued by the user, then it is discriminated based on the limitation item set upon user registration of the user whether or not the user is permitted to read all of the data files recorded in the recording section 14. Further, where the user is permitted to read all of the data files, a list of all of the remaining data files is displayed. Consequently, a person who takes charge of management of the home server 1 can confirm availability of the home server 1 and take a necessary countermeasure.

In this instance, since the home server 1 performs user authentication using an image of a fingerprint which is an image of part of the body of the user in this manner, it can selectively provide contents suitable for each user without causing the user to intend inputting of a password or the like. Consequently, the convenience to the user can be enhanced and the facility in use of the user can be improved.

(1-3) Effects of the First Embodiment

With the home server 1 having the configuration described above, since a user is identified on the remote commander side and an identification code is set and a data file is recorded based on a result of the identification, the user can find out data files recorded by the user itself simply and readily from among a great number of data files recorded in the recording medium. Further, various limitations such as to make data files of a particular user secrete can be set simply and readily.

In particular, since the remote commander 2 which outputs a remote control signal to the home server 1 which is a data file processing apparatus includes user identification means composed of the fingerprint acquisition section 4 and the user authentication section 5 for identifying a user and transmission means composed of the controller 7 and the transmission section 6 for transmitting an identification code for identification of the user based on a result of the identification of the user identification means to the data file processing apparatus, the home server 1 can record data files relate to the user of each of which can be identified from its identification code, and consequently, any user can find out data files recorded by the user itself simply and readily from among a great number of data files recorded on a recording medium.

Further, since the user identification means includes information acquisition means composed of the fingerprint acquisition section 4 for acquiring information representative of a physical characteristic of a user and the user authentication section 5 serving as user authentication means for specifying the user based on the information acquired by the information acquisition means, such processing as described above can be executed without executing complicated operation such as to input a password, and the convenience in use of the user can be improved as much.

Further, since the information representative of a physical characteristic is image information of part of the body of the user, the user can be identified applying the process of fingerprint authentication.

(2) Second Embodiment

Figure 3:
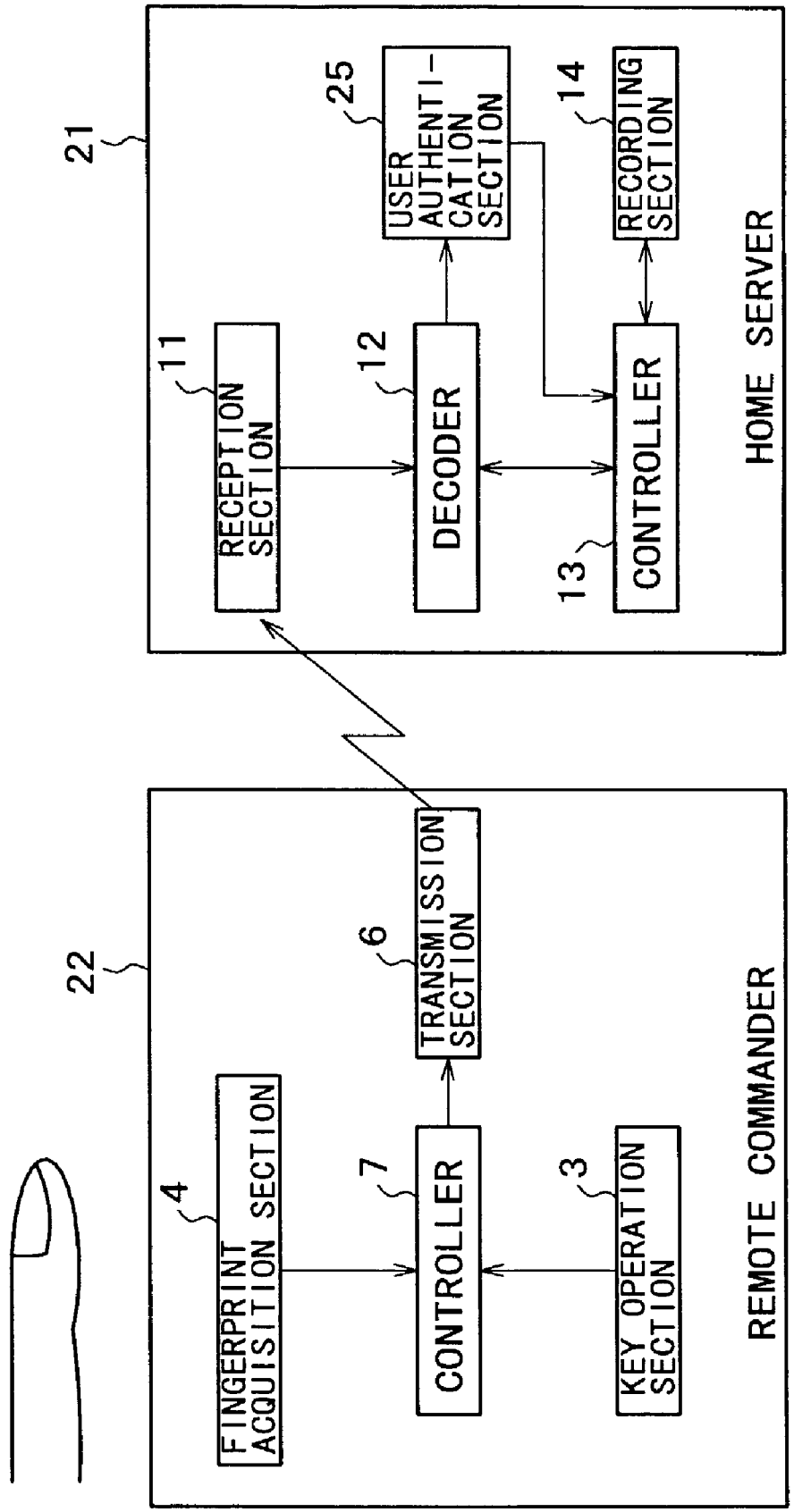
FIG. 3 is a block diagram showing another home server to which the present invention is applied together with a remote commander therefor.

FIG. 3 shows another home server to which the present invention is applied. Referring to FIG. 3, the home server shown is denoted by 21 and changes over its operation under the remote control of a remote commander 22. The home server 21 and the remote commander 22 individually have similar configurations to those of the home server 1 and the remote commander 2, respectively, except that the remote commander 22 does not include the user authentication section 5 but the home server 21 additionally includes a user authentication section 25 such that a fingerprint acquired by the remote commander 22 is processed by the home server 21 side.

In particular, upon user registration, the remote commander 22 acquires image data of a fingerprint of a user by means of the fingerprint acquisition section 4 and transmits the image data to the home server 21 together with data of a limitation item. The home server 21 processes the image data by means of the user authentication section 25 and records resulting data into the memory. Further, the home server 21 records the data of a limitation item and the identification code corresponding to the image data.

On the other hand, upon recording, the remote commander 22 acquires image data of a fingerprint and transmits the image data to the home server 21 together with a control command similarly. The home server 21 processes the image data by means of the user authentication section 25 to identify the user who has issued the recording instruction. Further, after recording of a data file in accordance with the control command is completed, the home server 21 sets an identification code based on a result of the identification from the user authentication section 25 to update the recording history information.

Further, upon reproduction, the remote commander 22 similarly acquires image data of a fingerprint and transmits the image data to the home server 21 together with a reproduction command. The home server 21 processes the image data by means of the user authentication section 25 to identify the user who has issued the reproduction instruction. Further, the home server 21 searches the recording history file relate to a result of the identification of the user and provides a file list to the user in accordance with a limitation item searched out from the recording history file.

Also where the user identification means is provided on the data file processing apparatus side as shown in FIG. 3, similar effects to those of the first embodiment can be achieved.

(3) Modification

The first and second embodiments may be modified such that not an image of a fingerprint as an image of part of the body representative of a physical characteristic of a human being but an image of a vein pattern or an image of a retina pattern which similarly is an image of part of the body of a human being representative of a physical characteristic is used to identify a user.

Also where an image of some other part of the body representative of a physical characteristic than the fingerprint is used for identification of a user, similar effects to those of the first or second embodiment can be anticipated.

(4) Third Embodiment

Figure 4:
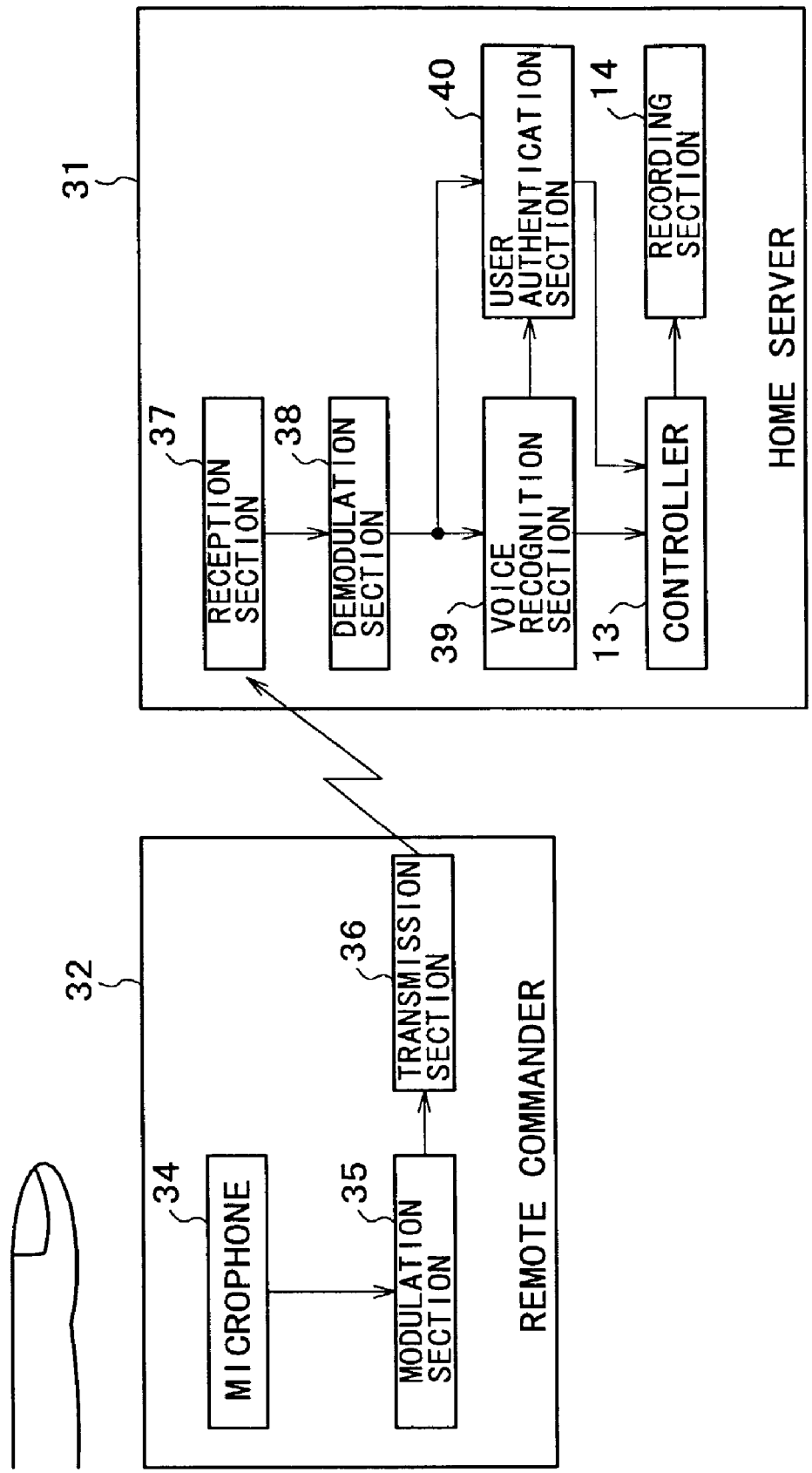
FIG. 4 is a block diagram showing a further home server to which the present invention is applied together with a remote commander therefor.

FIG. 4 shows a further home server to which the present invention is applied. Referring to FIG. 4, in the present embodiment, an operation of a user is accepted through voice recognition of a home server 31. To this end, a remote commander 32 acquires a voice signal of a user by means of a microphone 34, modulates the voice signal by means of a modulation section 35 and transmits the modulated voice signal to the home server 31 by means of a transmission section 36.

In the home server 31, the voice signal of the user transmitted from the remote commander 32 is received by a reproduction section 37 and demodulated by a demodulation section 38. Then, voice recognition and voice analysis of the demodulated voice signal are performed by a voice recognition section 39 to detect an instruction inputted by voice by the user.

Further, a user authentication section 40 receives the demodulated voice signal from the demodulation section 38 and performs voice print analysis of the voice signal. Further, the user authentication section 40 records a result of the analysis and registers the user. Furthermore, the user authentication section 40 compares a result of such voice print analysis with results of the analysis of user registrations to identify a user who has issued an instruction and notifies the controller 13 of a result of the identification.

Also where a voice print of voice information is used in place of an image of part of the body as information representative of a physical characteristic to identify a user in this manner, similar effects to those of the first or second embodiment or the modification to the first or second embodiment can be anticipated.

(5) Modifications

While, in the embodiments and the modifications described above, a user is identified by voice recognition or by image processing of a fingerprint, a vein pattern or the like, the present invention is not limited to the specific configurations, but a user may otherwise be identified based on some other physical characteristic, that is, biometrics information. Further, for example, operating elements for different users may be provided on the remote commander such that a user is identified based on an operated one of the operating elements.

Further, while, in the embodiments and the modifications described above, a user who operates the remote commander is identified supposing that the single remote commander is used by a plurality of users, the present invention is not limited to the specific configuration, but otherwise a remote commander for exclusive use may be allocated to each of a plurality of users such that the user may be identified through identification of the operated remote commander.

Further, while, in the embodiments and the modifications described above, a limitation item is set simultaneously upon user registration, the present invention is not limited to the specific configuration, but such a limitation item may otherwise be set separately by setting of a person who takes charge of the management.

Further, while, in the embodiments and the modifications described above, image data of a fingerprint or a result of processing of a voice print that is registered upon user registration, the present invention is not limited to the specification configuration, but where a user can be identified with sufficient reliability, recording of such data may be omitted. Where recording of such data is omitted or where setting of a limitation item is executed separately, the processing for user registration can be omitted.

Further, while, in the embodiments and the modifications described above, setting of a limitation item is accepted in the form of alternative selection between whether a user should be permitted to read all data files or to read only those data files which have been recorded by an instruction of the user itself, the present invention is not limited to the specific configuration, but, for example, such a setting method as to register users hierarchically and permit a user registered in a high hierarchy to read also those data files registered by another user of a lower hierarchy can be applied widely. Further, such limitation may be applied depending upon selection of a user upon reproduction.

Furthermore, while, in the embodiments and the modifications described above, the present invention is applied to a home server and a remote commander, the present invention is not limited to the specific configuration but can be applied widely to a case wherein a video file or an audio file is recorded into a randomly accessible recording medium such as an optical disk apparatus or a hard disk apparatus, another case wherein any other file than video and audio files is recorded on, and so forth.

While preferred embodiments of the present invention have been described using specific terms, such description is for illustrative purposes only, and it is to be understood that changes and variations may be made without departing from the spirit or scope of the following claims.

What is claimed is:

1. A data file processing apparatus, comprising:
   accepting means for accepting an instruction to record the data file issued from a user through a terminal apparatus;
   content acquiring means for acquiring content to be recorded as the data file;
   user identification means for identifying the user who issued the instruction to record the data file;
   file recording means for setting, based on a result of the identification by said user identification means, an identification code for identifying the user who issued the instruction to record the data file and recording the data file resulting from the instruction from the user to record a data file in correspondence with the identification code which corresponds to the user who issued the instruction to record the data file on a randomly accessible recording medium,
   wherein said user identification means includes:
   information acquisition means for acquiring information representative of a physical characteristic of the user through the terminal apparatus, the information acquired by said information acquisition means being distinct from the content acquired by the content acquiring means; and
   user authentication means for specifying the user based on the information acquired by said information acquisition means.

2. A data file processing apparatus according to claim 1, wherein the information representative of a physical characteristic of the user is image information of part of the body of the user, and said user authentication means specifies the user based on a result of analysis of the image information.

3. A data file processing apparatus according to claim 1, wherein the information representative of a physical characteristic of the user is voice information of the user, and said user authentication means for discriminating a voice print of the user based on the voice information to specify the user.

4. The data file processing apparatus according to claim 1, wherein the data file resulting from the instruction is able to be stored in correspondence with only a single identification code corresponding to a single user.

5. A data file processing system comprising: a remote control apparatus comprising: user identification means for acquiring information regarding a user who issued an instruction to record a data file and for identifying the user based on the information, and transmission means for transmitting an identification code for identifying the user who issued the instruction to record the data file based on a result of the identification by said user identification means to said data file processing apparatus; a data file processing apparatus comprising: accepting means for accepting the instruction to record the data file issued from the user through the remote control apparatus a, content acquiring means for acquiring content to be recorded as data file, the content acquired by the content acquiring means being distinct from the information acquired by the user identification means, and file recording means for setting, based on a result of the identification by said user identification means, an identification code for identifying the user who issued the instruction to record the data file and recording the data file resulting from the instruction from the user to record a data file in correspondence with the identification code with correspond to the user who issued the instruction to record the data file on a randomly accessible recording medium, wherein said user identification means includes: information acquisition means for acquiring information representative of a physical characteristic of the user, and user authentication means for specifying the user based on the information acquired by said information acquisition means.

6. The data file processing system according to claim 5, wherein said the information representative of a physical characteristic of the user is image information of part of the body of the user, and said user authentication means specified the user based on a result of analysis of image information.

7. The data file processing system according to claim 5, wherein the information representative of a physical characteristic of the user is voice information of the user, and said user authentication means discriminate a voice print of the user based on the voice information to specify the user.

8. A control method for data file processing apparatus, comprising: receiving an instruction from a user through a terminal apparatus to record the data file; acquiring content to be recorded as the data file; acquiring information representative of a physical characteristic of the user through the terminal apparatus, the information being distinct from the acquired content; specifying the user based on the information acquired by the information acquisition; identifying the user who issued the instruction based on the acquiring and the specifying; and setting, based on a result of the identification by the user identification step, an identification code for identifying the user and recoding the data file resulting from the instruction from the user to record the data file in correspondence with the identification code which corresponds to the user who issued the instruction to record the data file on a randomly accessible recording medium, wherein the information representative of a physical characteristic of the user is image information of part of the body of the user, and the user authentication step specifies the user based on a result of analysis of the image information.

9. The control method for a data file processing apparatus according to claim 8, wherein the information representative of a physical characteristic of the user is voice information of the user, and the user authentication step discriminates a voice print of the user based on the voice information to specify the user.

10. A remote control method for a data file processing apparatus, comprising: receiving an instruction from a user through a terminal apparatus to record the data file; acquiring content to be recorded as the data file; acquiring information regarding the user who issued the instruction to record the data file; an information acquisition step of acquiring information representative of a physical characteristic of the user; a user authentication step of specifying the user based on the information acquired by the information acquisition step; identifying the user who issued the instruction using the acquired information, the acquired information being distinct from the acquired content; setting, based on a result of the identification by the user identification step, an identification code for identifying the user and recording by a remote control signal the data file resulting from the instruction from the user to record the data file in correspondence with the identification code which corresponds to the user who issued the instruction to record the data file on a randomly accessible recoding medium; and transmitting the identification code for identifying the user to said data file processing apparatus based on a result of the identification.

11. The remote control method for a data file processing apparatus according to claim 10, wherein the information representative of a physical characteristic of the user is image information of part of the body of the user, and the user authentication step specifies the user based on a result of analysis of the image information.

12. The remote control method for the data file processing apparatus according to claim 10, wherein the information representative of a physical characteristic of the user is voice information of the user, and the user authentication step discriminates a voice print of the user based on the voice information to specify the user.

* * * * *